United States Patent
Wright et al.

[11] Patent Number: 5,923,741
[45] Date of Patent: Jul. 13, 1999

[54] FLEXIBLE SYSTEM FOR REAL-TIME RATING OF TELECOMMUNICATIONS TRANSACTIONS

[76] Inventors: Carl A. Wright; Becky L. Glesner, both of 3168 N. Prospect Rd., Ypsilanti, Mich. 48198-9426

[21] Appl. No.: 08/832,881

[22] Filed: Apr. 4, 1997

[51] Int. Cl.⁶ .................................................. H04M 15/00
[52] U.S. Cl. .......................... 379/114; 379/119; 379/121; 455/405
[58] Field of Search ..................... 379/112, 114, 379/115, 116, 119, 120, 121, 127; 455/405, 406, 407

[56] References Cited

U.S. PATENT DOCUMENTS

| | | | |
|---|---|---|---|
| 4,726,056 | 2/1988 | An et al. | 379/115 |
| 5,148,472 | 9/1992 | Freese et al. | 379/59 |
| 5,185,785 | 2/1993 | Funk et al. | 379/111 |
| 5,291,543 | 3/1994 | Freese et al. | 379/59 |
| 5,301,223 | 4/1994 | Amadon et al. | 379/58 |
| 5,488,655 | 1/1996 | Hamlen | 379/114 |
| 5,517,555 | 5/1996 | Amadon et al. | 379/59 |
| 5,519,769 | 5/1996 | Weinberger et al. | 379/112 |
| 5,528,585 | 6/1996 | Cooley et al. | 370/56 |
| 5,633,919 | 5/1997 | Hogan et al. | 379/115 |
| 5,687,223 | 11/1997 | Elliot et al. | 379/115 |
| 5,719,926 | 2/1998 | Hill | 379/114 |

*Primary Examiner*—Paul Loomis
*Attorney, Agent, or Firm*—Gifford, Krass, Groh, Sprinkle, Anderson & Citkowski, PC

[57] ABSTRACT

Methods and apparatus facilitate rating of telecommunications transactions and allow modification of the rating process without requiring reprogramming of the rating system program. An input data structure includes pointers to functions that return internally or externally derived data values to the rating system program. By virtue of a system of selection criteria and selection rules, the rating system program evaluates telecommunications transaction characteristics to obtain appropriate rating data for the transaction and to calculate charges based on this rating data.

11 Claims, 4 Drawing Sheets

PRIMARY SELECTION CRITERIA

| Priority Ordinal | Phone Number Template | Selection SAID | Description | Rate Table ID SAID | User Defined |
|---|---|---|---|---|---|
| 1 | 520200 | 1 | AZ#5 Caller pays-CFW/TO/CP | 1 | CPB AZ5 CPB 01 P |
| 2 | 520200 | 2 | AZ#5 Caller pays-incoming | | AZ5 CPB 33 P |
| 3 | @@@411 | 3 | Directory Assistance/Local | 2 | 32 P |
| 4 | 8003584636 | 4 | Silent Witness (#4636) | | 00 X |
| 5 | 911 | | Emergency Service | | 00 X |

INDICATES SECONDARY SELECTION CRITERIA SPECIFIED IN A SPECIAL NUMBER ACCESSORY SUBTABLE

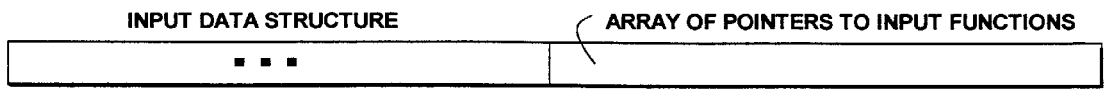

Figure - 1

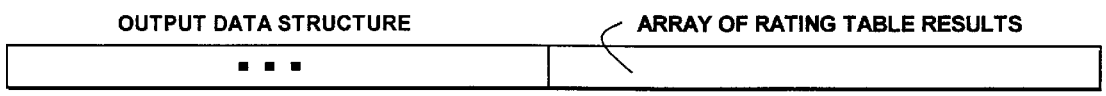

Figure - 2

PRIMARY SELECTION CRITERIA

| Priority Ordinal | Phone Number Template | Selection SAID | Description | Rate Table ID SAID | User Defined |
|---|---|---|---|---|---|
| 1 | 520200 | 1 | AZ#5 Caller pays-CFW/TO/CP | 1 | CPB AZ5 CPB 01 P |
| 2 | 520200 | 2 | AZ#5 Caller pays-incoming | | AZ5 CPB 33 P |
| 3 | @@@411 | 3 | Directory Assistance/Local | 2 | 32 P |
| 4 | 8003584636 | 4 | Silent Witness (#4636) | | 00 X |
| 5 | 911 | | Emergency Service | | 00 X |

INDICATES SECONDARY SELECTION CRITERIA SPECIFIED IN A SPECIAL NUMBER ACCESSORY SUBTABLE

Figure - 3a

| Selection SAID | Priority Ordinal | Data Type | Data Value |
|---|---|---|---|
| 1 | 1 | SSWID | 01 |
| 1 | 2 | DIREC | 0 |
| 1 | 3 | SERTP | AIR |
| 2 | 1 | SSWID | 01 |
| 2 | 2 | DIREC | 1 |
| 3 | 1 | SSWID | 02 |
| 3 | 2 | SSID | 0026 |
| 3 | 3 | SERTP | DDD |
| 4 | 1 | SSWID | 01 |
| 4 | 2 | SSID | 01032 |

*Figure - 3b*

| Accessor Number | Accessor Return Type | Access Data Type |
|---|---|---|
| 1 | C | ORGTK |
| 2 | L | SEC |
| 3 | L | SSWID |

*Figure - 3c*

| Carrier Code | Service ID | Service Type | Selection SAID | Rate Table SAID | User Defined Data | Contract ID |
|---|---|---|---|---|---|---|
| ATT | MTS | DDD | 1 | 1 | MEXICO | |
| ATT | MTS | DDD | 2 | 5 | OVERSEAS | |
| ATT | MTS | DDD | 3 | 2 | INTERSTATE | |
| OMA | HOME | AIR | 4 | 3 | AIR | OMA18838 |
| OMA | HOME | AIR | 5 | 4 | ROAMER AIR | OMA12182 |

*Figure - 4a*

| Selection SAID | Priority Ordinal | Accessor SAID |
|---|---|---|
| 1 | 1 | 1 |
| 2 | 1 | 2 |
| 3 | 1 | 3 |
| 3 | 2 | 7 |
| 4 | 1 | 4 |
| 4 | 2 | 5 |
| 5 | 1 | 6 |

*Figure - 4b*

| Accessor SAID | Priority Ordinal | Data Type | Data Value |
|---|---|---|---|
| 1 | 1 | ORGRA | 1 |
| 1 | 2 | DSGRA | 3 |
| 2 | 1 | ORGRA | 1 |
| 2 | 2 | DSGRA | 9 |
| 3 | 1 | ORGRA | 1 |
| 3 | 2 | STATE | INTER |
| 3 | 3 | LATA | INTER |
| 7 | 1 | ORGRA | 1 |
| 7 | 2 | STATE | INTER |
| 7 | 3 | LATA | INTRA |
| 4 | 1 | SSID | 00137 |
| 4 | 2 | BSID | 00080 |
| 5 | 1 | SSID | 00187 |
| 5 | 2 | BSID | 00181 |
| 6 | 1 | SSID | 00187 |
| 6 | 2 | BCARR | VANGD |

*Figure - 4c*

| Start Eff. Date | End Eff. Date | Band Table Source | Band Table ID | Priority Ordinal | Accessor SAID | Rate Line Ref. Number |
|---|---|---|---|---|---|---|
| 19951201 | 99999999 | CCMI | ATT 18XX11 | 1 | 1 | 1 |
| 19960223 | 99999999 | CCMI | ATT 18XX11 | 2 | 2 | 1 |
| 19960223 | 99999999 | CCMI | ATT 18XX11 | 3 | 3 | 1 |
| 19960130 | 99999999 | CCMI | ATT 18XX11 | 4 | 4 | 1 |
| | | | | | ⋮ | |
| 19941116 | 99999999 | CCMI | ATT 18XX11 | 50 | 50 | 2 |
| 19941116 | 99999999 | CCMI | ATT 18XX11 | 51 | 51 | 2 |
| 19941116 | 99999999 | CCMI | ATT 18XX11 | 52 | 52 | 3 |

*Figure - 5a*

| Accessor SAID | Priority Ordinal | Data Type | Data Value |
|---|---|---|---|
| 1 | 1 | ORGST | AL |
| 2 | 1 | ORGST | AZ |
| 3 | 1 | ORGST | AR |
| 4 | 1 | ORGST | CO |
| 5 | 1 | ORGST | DE |
| | | ⋮ | |
| 51 | 1 | ORGST | WA |
| 52 | 1 | ORGST | HI |

*Figure - 5b*

FLEXIBLE SYSTEM FOR REAL-TIME RATING OF TELECOMMUNICATIONS TRANSACTIONS

FIELD OF THE INVENTION

This invention relates generally to the field of telecommunications systems and, more particularly, to methods and apparatus for calculating charges for telecommunications transactions.

BACKGROUND OF THE INVENTION

Rating of telecommunications transactions has traditionally involved distinct local and toll rating criteria for wireline telephone services. A local carrier typically experienced lower costs when providing services from its own equipment and network in the local environment, but, when the service provided was non-local, a local carrier typically purchased services from another carrier and resells the non-local services to its subscribers. The purchase and resale of non-local services were, therefore, rated on a different basis than local services.

Although the distinction between local and non-local services has changed its shape in these days of integrated networks and national coverage, the distinction between services "manufactured" by the local carrier versus those resold from another carrier remains. Furthermore, the rating of combination of local/non-local telecommunications transactions by the local carrier will continue. Hence, rating systems used by local carrier preferably continue to accommodate non-local transaction processing. Additionally, changes in the market, in customer billing preferences, and in business models of local carriers, present a need for rating system flexibility, such that the carrier can unilaterally modify input parameters and rating behavior without interaction with the rating system vendor.

The rating (i.e., calculation of charges) of a telecommunications transaction may be accomplished in part by selecting specific rating parameters to be used in the calculation of charges based on characteristics of the individual telecommunications transaction. The characteristics of the transaction are typically provided to a rating system by the rating system user, such as the local carrier, and may include such data as the origin and destination of a transaction, the time of day that a transaction occurred, the duration of a transaction, etc. Rating systems preferably evaluate these transaction characteristics against rating criteria also provided by the rating system user, typically in the form of data tables accessible by the rating system program. The rating data resulting from this evaluation may be used in calculating charges for the transaction.

In some systems this evaluation may be accomplished on a deferred basis by storing the characteristics of a transaction and subsequently processing this data on a separate computer. Alternatively, other rating systems can calculate transaction charges on a real-time basis. Such real-time systems typically incorporate a complex web of large data tables designed to address all expected transaction characteristics. When new transaction characteristics are introduced to the rating system, the format of the data structure used to input the new characteristics to the rating system program must typically be changed. Furthermore, the rating system program must typically be modified to accommodate these new input characteristics and to effect the desired behavior in response to the new characteristics. Moreover, the rating data tables which define the rating behavior may also require modification.

One disadvantage of existing systems is the necessity that the user modify all three components of the rating system, such components being the input data structure, the rating system program, and the rating data tables. Preferably, the user of a commercial rating system should be able to extend a rating system without reprogramming the rating system program. Therefore, a need exists for a real-time telecommunications transaction rating system capable of accommodating new transaction input characteristics and rating selection criteria without requiring reprogramming of the rating system program itself.

SUMMARY OF THE INVENTION

The present invention provides methods and apparatus for rating telecommunication transactions, and for allowing modification by a user of this rating process without requiring reprogramming of the rating system program. Users of commercial rating systems may have access to input data of the rating system, and to the rating data tables on which the rating system performs its function. In contrast, the rating system program is typically developed and maintained by the rating system's vendor. As such, therefore, modifications to the rating system program are not under the user's control. In one embodiment, the invention preferably allows a user to modify a rating system to handle new transaction input characteristics, and new rating selection criteria, through modification of the input data and the rating data tables, which are both under user control, without requiring modifications to the rating system program itself. The invention performs the rating of a wide range of services, including cellular and wireline phone calls, fax store-and-forward services, modem services, short message services, and data packet services, at extremely high speed. Furthermore, the invention is extensible to rate new services using new rate selection criteria and new input data.

The invention permits a user to extend the rating capability along many dimensions, by adding information and rating behavior across at least the following:

Additional carriers

Additional types of service (fax, messaging, data, etc.)

Additional product IDs (product names, etc.)

Additional characteristics of the service rendered which determined the rate to apply New units of measure New methods to find the rate to use The invention is capable of receiving telecommunications transaction information to be rated, calculating the charges for the transaction, and delivering the results to other software components. The rating of services measured may be in any unit of measure provided in a supplied rate database. Thus, the user can rate by the number of fax pages, CDMA messages, kilobytes transmitted, by call duration, or by other criteria. The user can rate any service in more than one way. For example, by defining a group of rate tables which are processed for a call, the user can rate a fax transmission by its fax pages, by its duration, and by the number of kilobyte-minutes that it was in fax storage waiting to be delivered.

In a preferred embodiment, the invention may be employed in multiple phases of rating process. As such, a user may configure multiple aspects of their rating system without reprogramming the rating system program, without turning to the rating system vendor for modifications, or without sacrificing desired performance in a real-time rating system.

BRIEF DESCRIPTION OF THE DRAWINGS

FIG. 1 is a diagram of an input data structure to a rating system program.

FIG. 2 is a diagram of the output data structure of a rating system program.

FIG. 3a is a Rate Table Selection Data Table for Special Number processing, according to an embodiment of the invention.

FIG. 3b is a Special Number Accessor Sub-Table, containing secondary selection criteria for Special Number Processing, according to an embodiment of the invention.

FIG. 3c is an Accessor Mapping Table, indicating the input function indices associated with data types, according to an embodiment of the invention.

FIG. 4a is a Decision Data Table, used in the selection of non-local rating data for a telecommunications transaction in an embodiment of the invention.

FIG. 4b is a Decision Selection Rules Sub-Table, containing selection rules used in selecting non-local rating data in an embodiment of the invention.

FIG. 4c is a Decision Accessor Sub-Table, containing secondary selection criteria for non-local rate processing in an embodiment of the invention.

FIG. 5a is a Band Definitions Data Table, used in the selection of local area band data for a telecommunications transaction in an embodiment of the invention.

FIG. 5b is a Band Accessor Sub-Table, containing secondary selection criteria for local area band processing in an embodiment of the invention.

DETAILED DESCRIPTION OF THE PREFERRED EMBODIMENT

Generally, telecommunications rating systems contain the functionality to determine the charges for a particular telecommunication transaction. Typically, a rating system program is called to rate each telecommunication transaction provided. In the event that a call or other customer transaction represents multiple types of service (i.e., cellular air time and toll), then the subroutine may be called for each type service provided. In a preferred embodiment of the invention, the calling arguments are passed as an input data structure, the rating processing is performed, and the results of the rating process are returned in an output data structure.

FIG. 1 depicts an input data structure derived from a data message defining a telecommunications transaction. The input data structure in the preferred embodiment includes fields for a structure version number, an origin telecommunications number (e.g., a phone number), a destination telecommunications number, a billing telecommunications number, a charge direction, a charge time, a service type, a local carrier, a local carrier service ID, a non-local carrier, a non-local carrier service ID, an international carrier, an international carrier service ID, a local pricing switch, a mileage calculation switch, and an array of pointers to input functions (Accessor Functions). In a preferred embodiment, this array is large enough to hold 30 pointers to functions.

FIG. 2 depicts an output data structure returnable by a rating system program. The output data structure in a preferred embodiment includes fields for an error message, a warning message, the origin city, the origin state, the origin local access transport area (LATA), the origin V coordinate, the origin H coordinate, the exchange area address (EAA), the destination city or country, the destination state or province, the destination LATA, the destination V coordinate, the destination H coordinate, the destination EAA, the billed mileage, the number of the local plan priced, six character flags indicating the available local plans, a flag indicating a supported local calling area (LCA), a flag indicting whether rates for the LCA are available, space for user-defined data, the call type, the total charge for the transaction, and an array containing the results of up to five rate tables.

In a preferred embodiment, the results from a rate table include fields for a rate table source code, a rate table ID, the day type, the starting rate period, the unit of measure, a state surcharge amount, an initial units charge, an initial unit amount, the rate periods used, the rate period number, the rate period description, the charge for additional units, the amount of additional units, the number of additional periods, the source of discount/surcharge, the discount/surcharge ID, and the discount/surcharge amount. Note that the rating system program is capable of returning a status value indicating the success or failure of the rating process.

For each service rated, the rating process may be categorized in three stages: (1) Special Number Processing; (2) Local Processing; and (3) Non-local Processing. Special Number Processing is based primarily on characteristics of the telecommunications number used at the origin of the transaction. Local Processing primarily addressed transactions wherein both origin and destination are located within the same local rating area. Non-local Processing typically handles telecommunications transactions wherein origin and destination are not in the same local rating area or when local carrier data for the transaction is unavailable.

One embodiment of the invention is illustrated in FIGS. 3a, 3b, and 3c as an element of Special Number Processing. FIG. 3a depicts a rate table selection data table for special numbers. This table contains a primary selection criterion against which the telecommunication number of the transaction is evaluated. Other fields in this table include a priority ordinal number which represents the ordering of the data records in the table, a selection system address identifier (SAID), which points to a record or a group of records in the special number accessor selection subtable, and a rate table ID SAID, which points to a record or a group of records in the special number rate table selection subtable. When the rating system program is evaluating a telecommunications number, it first compares the number or portions of the number against a primary selection criterion, labeled in this table as the phone number template. If the telecommunication number satisfies, or "matches," the primary selection criterion, the rating system program looks up the data records indicated by the selection SAID in the special number accessor subtable. These corresponding data tables indicate secondary selection criteria that will be evaluated against data returned from input functions indicated in the input data structure.

The determination of which input function corresponds to which data type is controlled by the accessory mapping table in FIG. 3c. For example, if a telecommunications number satisfies the primary selection criterion corresponding to directory assistance in FIG. 3a, the rating system program looks up secondary selection criteria corresponding to selection SAID '3'. Upon determining that the first data type of the set of secondary selection criteria corresponds to the data type SSWID (serving switch ID), the program then looks up the SSWID data type in the accessor mapping table. The accessor number corresponding to the SSWID data type in the accessory mapping table is '3', indicating the index of the appropriate input function pointer in the array of pointers of the input data structure. The rating system program then initiates execution of the input function and receives the resulting data value of the execution. The resulting data value is then compared to the data value of the corresponding data type in the special number accessor subtable, in this case '02'. This procedure is repeated for all data types and input functions indicated by the selection SAID '3'. Note that the order of the elements of each set of secondary selection criteria may be used to prioritize the individual evaluations with resulting data values. The accessor mapping table also includes the return type of the resulting data value.

If each element of the secondary selection criteria is satisfied by resulting data values of the input functions the rating system program has found a match for the telecommunications transaction it is processing. If so, the system uses the rate table indicated by the rate table ID SAID, in this case '2', to obtain rating information for this transaction. It should be noted that in this embodiment, the rate table ID SAID indicates a set of rating tables corresponding to rate table ID SAID 2.

FIGS. 4a, 4b and 4c depict a second embodiment, relating to non-local rate table selection. In FIG. 4a, the decision data table contains a group of data records, each record corresponding to a combination of carrier codes, service ID, and service type. These combinations constitute the primary selection criterion for the decision data table. In this table, the selection SAID indicates one or more selection rules in the decision rules subtable. Each selection rule indicates a set of secondary selection criteria in the decision accessor subtable.

As described above with regard to special number processing, the rating system program first compares the carrier code service ID and service type of a telecommunications transaction with the primary selection criterion in the decision data table. Upon finding a match the rating system program then looks up the appropriate selection rule or rules in the decision selection rules subtable and applies the appropriate secondary selection criteria to data returned by the input functions, as indicated by the data type of the Secondary Selection Criterion. For example, a transaction that matches the "Interstate" data record in the decision data table, as described by the user-defined data field, corresponds to the selection SAID '3'. The rating system program then looks up the accessor SAIDs corresponding to the selection rules in the decision selection rules subtable.

In this example, the accessor SAIDs corresponding to selection to SAID '3' are accessor SAID '3' and accessor SAID '7', in that order. Note that the ordering in the decision selection rules subtable is significant in that it defines the priority of the selection rules, that is, the rating system program will first determine whether the transaction satisfies the secondary selection criteria of accessor SAID '3'. If the secondary selection criteria of accessory SAID '3' are not satisfied, the rating system program then evaluate accessory SAID '7'.

Continuing with the example, the rating system program will first evaluate the secondary selection criteria indicated by accessory SAID '3' with the resulting data values returned by the input functions corresponding to the corresponding data types, in this case ORGRA (origin rating area), STATE (origin to destination state relationship), and LATA. Upon finding a match, the rating system program will then identify the rate table associated with the matched primary selection criterion and matched selection rule with the transaction. This rate table data may then be used in calculating the charge for the telecommunications transaction. In FIG. 4a, the rate table ID SAID may indicate one or more rate tables associated with that rate table ID SAID. Also, the input functions that correspond to the data types are indicated by the accessor mapping table of FIG. 3c.

FIG. 5 depicts band definitions in the band definition table. Band definitions characterize relationships between area codes. Data in the band definition table selects the appropriate rating data for a specific band table number and band table source. In one embodiment, the primary selection criterion in the band definition table is a combination of the start effective date, effective date, band table source and band table ID fields. The accessor SAID indicates the corresponding secondary selection criteria contained in the band accessor subtable. The secondary selection criteria is evaluated against the resulting data values returned by the corresponding input functions, as designated by the data type and the accessor mapping table. A match in the band definition table indicates the which line in a rate table applies to the transaction.

The invention is capable of being used in additional aspects of the rating process wherein configurability of rating selection criteria is desired without the additional requirement of changes to the rating system program.

Furthermore, in a preferred embodiment, the input functions are capable of accessing data that exists external to the rating system. For example, an input function may determine the volume of transactions of Dow Industrial stocks and return that value for evaluation against the secondary selection criteria. An input function may further perform additional processing on such external data and return a result based on this processing for comparison against the secondary selection criteria.

What is claimed is:

1. A method of rating a telecommunications transaction defined by a data message, comprising the steps of:

receiving an input data structure derived from the data message, the input data structure indicating one or more input functions, each input function being capable of returning a resulting data value, and wherein at least one of the input functions is capable of accessing and operating upon data external to the transaction;

identifying a transaction data value associated with the transaction;

accessing a data table having at least one data record, each data record having a primary selection criterion, an indicator of corresponding rating data, and an indicator of at least one secondary selection criterion, the secondary selection criterion having a selection data type and a selection data value; and associating the transaction with the secondary selection criterion when the transaction data value satisfies the corresponding primary selection criterion.

2. The method of claim 1 further comprising the steps of:

initiating the execution of an input function corresponding to the selection data type; and associating the rating data corresponding to the primary selection criterion to the transaction when at least one of the resulting data values matches the corresponding selection data values.

3. The method of claim 1 further comprising the step of calculating charges for the transaction based on the associated rating data.

4. The method of claim 1 wherein the step of associating the secondary selection criterion to the transaction is accomplished by at least one selection rule indicated in the data record corresponding to the primary selection criterion, each selection rule indicting at least one secondary selection criterion.

5. The method of claim 4 further comprising the step of prioritizing the selection rules associated with primary selection criterion on the basis of the order of the selection rules in a selection rule data table.

6. A system for deriving rating information for a telecommunications transaction defined by a data message, the system comprising:
- a stored program controlled processor comprising:
  - an input data structure derived from the data message, the input data structure indicating one or more input functions, each input function being capable of returning a resulting data value, and wherein at least one of the input functions is capable of accessing and operating upon data external to the system;
  - one or more data tables having at least one data record, each data record having a primary selection criterion, corresponding rating data, and an indicator of at least one secondary selection criterion, each secondary selection criterion having a selection data type and a selection data value;
  - a mapping table capable of associating a selection data type with one of the input functions; and
  - a rating program capable of performing the following functions:
    - receiving the input data structure,
    - identifying a transaction data value associated with the transaction,
    - associating the transaction with at least one secondary selection criterion when the transaction data value satisfies the corresponding primary selection criterion,
    - initiating the execution of an input function corresponding to the selection data type, and
    - associating the rating data corresponding to the primary selection criterion to the transaction when at least one of the resulting data values matches the corresponding selection data values.

7. The system of claim 6 wherein the rating system program associates the secondary selection criterion to the by at least one selection rule indicated in the data record corresponding to the primary selection criterion, each selection rule indicating at least one of the secondary selection criteria.

8. The system of claim 6 wherein the rating program is further capable of calculating charges for the transaction based on the rating data associated with the transaction.

9. The system of claim 6 wherein the selection rules corresponding to a primary selection criterion are prioritized by their order in a selection rule data table.

10. The system of claim 6 further including a mapping table capable of associating the selection data type with one of the input functions and the data type of the resulting data values returned by the input function.

11. The system of claim 6 wherein the input functions are capable of processing information external to the rating system.

* * * * *